UNITED STATES PATENT OFFICE.

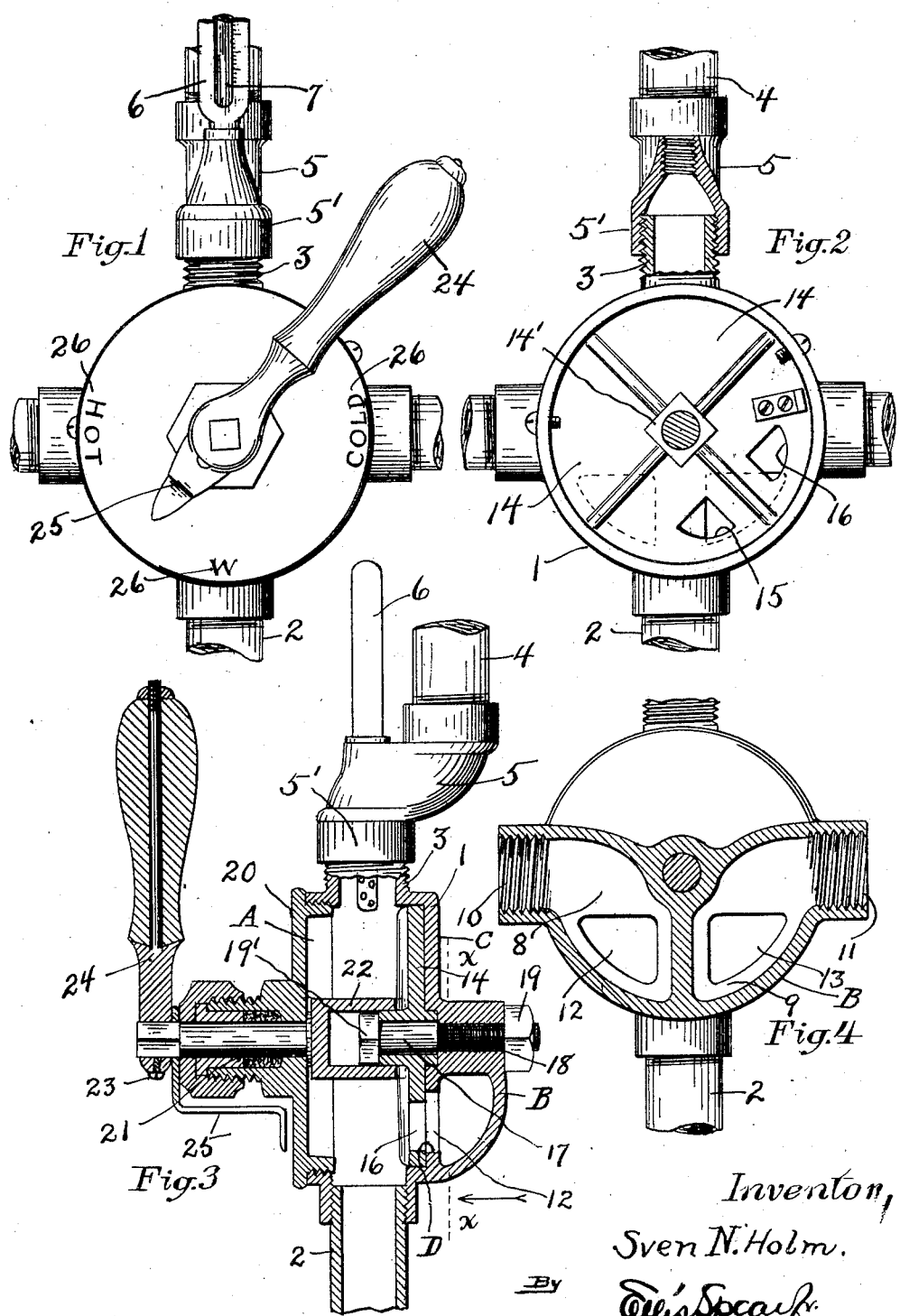

SVEN N. HOLM, OF DORCHESTER, MASSACHUSETTS.

THERMAL MIXTURE-FIXTURE.

1,381,922.          Specification of Letters Patent.     Patented June 21, 1921.

Application filed April 13, 1918. Serial No. 228,336.

*To all whom it may concern:*

Be it known that I, SVEN N. HOLM, a citizen of the United States, residing at Dorchester, county of Suffolk, Commonwealth of Massachusetts, have invented certain new and useful Improvements in Thermal Mixture-Fixtures, of which the following is a specification.

This invention relates to mixing valves and particularly to a fixture for mixing hot and cold water for use in bath tubs, shower baths or both.

The proportioned control of hot and cold water where a combined flow is required, as for example, for the purpose of bathing, involves various difficulties which are of common experience.

The tempering of cold water by the admission of a small amount of hot water, or the lowering of the temperature of a too hot supply by the admission of a small amount of cold, or the averaging of hot and cold supplies to make a tepid bath while apparently simple, are known from experience to be difficult and to frequently result not only in discomfort, but occasionally in actual harm by scalding or shock.

The object of my present invention is to provide for the mixing of hot and cold water to effect the desired temperature and for the convenient control and delivery of the same by means adapted for ordinary use.

The constructive aspect of my invention is well illustrated by an embodiment presented in the accompanying drawings, throughout which and the following specification like reference numerals are employed to indicate corresponding parts, and in these drawing:

Figure 1 is front elevation of a valve in accordance with my invention.

Fig. 2 is a similar view partly in section with cap removed.

Fig. 3 is a central vertical partial section, and

Fig. 4 is a section on the line $\omega$—$\omega$ of Fig. 3.

In the form shown my mixing valve comprises a casing 1 of generally cylindrical form having a delivery 2 for tub or the like, and an upward delivery riser 3 for connection as by the pipe 4 with a shower bath attachment. The coupling 5 is preferably made in the form of an offset connection having its lower portion $5^1$ connecting with the upward delivery 3 of the chamber 1 formed as a shouldered offset portion into which is tapped a suitable frame or holder 6 in which is held a thermometer 7 the stem of which projects down into the opening 3 and is thus protected while its reservoir end is exposed to the contents of the main chamber of the casing 1 without projecting into the chamber itself.

The casing 1 provides a substantially cylindrical mixing chamber A and has integrally formed on its inner face a depending rounded inlet chamber portion B. The portion B extends across the inner face of the chamber A at one side of the horizontal axis of said chamber, considering the valve as it appears in Fig. 3, and provides a pair of independent hot and cold water inlets 8 and 9 which are connected at 10 and 11 with the hot and cold water supply pipes, and at 12 and 13 with the mixing chamber A. The bottom wall of the chamber A at the opposite side of the inlet chamber portion B extends as a relatively flat valve seat portion C, and the chamber portion B is provided with an inwardly extended rib D co-planer with said portion C and constituting therewith a valve seat for a ported disk valve 14. The valve 14 has ports 15 and 16 adapted to cover and uncover the ports 12 and 13, and is rotatably mounted on a stud 17 tapped at 18 into the back of the extension walls at the rear of the casing 1. The disk 14 is provided with a squared projection $14^1$ through which the stud 17 passes, being secured by a lock nut 19.

The cover plate 20 having a suitable stuffing box 21 carries a wrench head 22 adapted to fit over and clear the stud head $19^1$, but engage the squared portion $14^1$ of the disk 14. The wrench 22 has a suitable stem 23 extending through the stuffing box 21 and is operated by a handle 24. The pointer 25 is mounted on the squared end of the stem 23 and coöperates with a series of indices 26 to indicate the position of the ports of the disk 14 relative to the openings 12 and 13.

In operation as will be seen it is possible at first and previous to opening the control valves of the shower bath or of the tub delivery to admit a preliminary and test mixture of hot and cold water into the main chamber of the casing 1. The reading of the pointer 25 on the indications 26 makes it possible to approximate the required mixture but while the proportions of hot and cold water may be thus determined, their relative temperatures are unknown.

The thermal average, however, will be properly indicated by the thermometer 7 and the temperature of the preliminary discharge of water thus be known in advance with sufficient degree of accuracy to avoid any discomfort or accident.

As the water is drawn, variations are common in both the hot water supply and the cold water supply. The cold water delivery may grow colder or become warmer according to the location of the pipes, and in the same way the hot water supply may become hotter or less warm. The results of the variations in mixture may be observed and anticipated in their delivery by watching the thermometer 7 and making any necessary readjustment in the setting of the handle 24.

In this way my fixture provides a very satisfactory control for water mixtures for bathing and other purposes and as illustrated is capable of construction in a form neat and attractive, simple to operate, and consistent with types of controls already familiar to users, and thus capable of being operated satisfactorily by the ordinary user.

Various modifications may obviously be made in details of structure and arrangement of parts, all without departing from the spirit of my invention if within the limits of the appended claims.

What I therefore claim and desire to secure by Letters Patent is:

1. A mixing fixture, comprising a shell providing a superposed mixing chamber, said shell having a depending inlet chamber portion extending across the bottom of said mixing chamber at one side of the central axis of the shell and said depending inlet portion providing a valve seat portion and providing hot and cold water inlet chambers communicating with a superposed mixing chamber, the bottom wall of said mixing chamber beyond said depending inlet portion constituting a valve seat portion alined with said valve seat portion of the depending inlet portion of the shell, and a valve seated on said seat portions and controlling the passage of water from said hot and cold inlet chambers to said mixing chamber.

2. A mixing fixture comprising a shell having a relatively flat valve seat portion at one side of its horizontal axis, and having to one side of the plane of said seat portion and at the opposite side of said axis a pair of independent hot and cold water intake chambers providing at their inner edge a valve seat portion alined with said first-named seat portion, a rotatable disk valve seating on said seat portions, and controlling said chambers, and means for rotating said valve.

3. A mixing fixture comprising a generally cylindrical shell providing a mixing chamber and having at one side of its central axis and integrally formed upon its under face a depending inlet chamber portion providing a pair of independent hot and cold water inlet chambers adapted to deliver to said mixing chamber, and a valve interposed between said mixing chamber and said inlet chamber portion and controlling the delivery of water to said mixing chamber.

In testimony whereof I affix my signature in presence of two witnesses.

SVEN N. HOLM.

Witnesses:
GEORGE B. RAWLINGS,
MARION F. WEISS.